July 10, 1962 A. CANDELISE 3,043,281

AIR INJECTION SYSTEM FOR AN INTERNAL COMBUSTION ENGINE

Filed March 4, 1960

INVENTOR.
Alfred Candelise
BY
O. D. McGraw
ATTORNEY

United States Patent Office 3,043,281
Patented July 10, 1962

3,043,281
AIR INJECTION SYSTEM FOR AN INTERNAL COMBUSTION ENGINE
Alfred Candelise, Flint, Mich., assignor to General Motors Corporation, Detroit, Mich., a corporation of Delaware
Filed Mar. 4, 1960, Ser. No. 12,856
1 Claim. (Cl. 123—26)

The invention relates to a system for injecting compressed air in the combustion chamber of an internal combustion engine and particularly to a system in which the air is distributed in timed relation to each combustion chamber of a multiple cylinder engine and injected into the combustion chamber through the spark plug.

A generally similar system is disclosed in my application Serial No. 12,857, filed March 4, 1960, in which the air leaving the timing and distribution valve is conducted to the spark plug introducing means by a conduit separate from the electrical lead connecting the spark plug with the engine distributor.

The proposed system combines the air conduit and electrical lead into a single unit so as to simplify the installation of the system, and omit unnecessary wiring and conduit structures which complicate maintenance and repair services.

Figure 1:
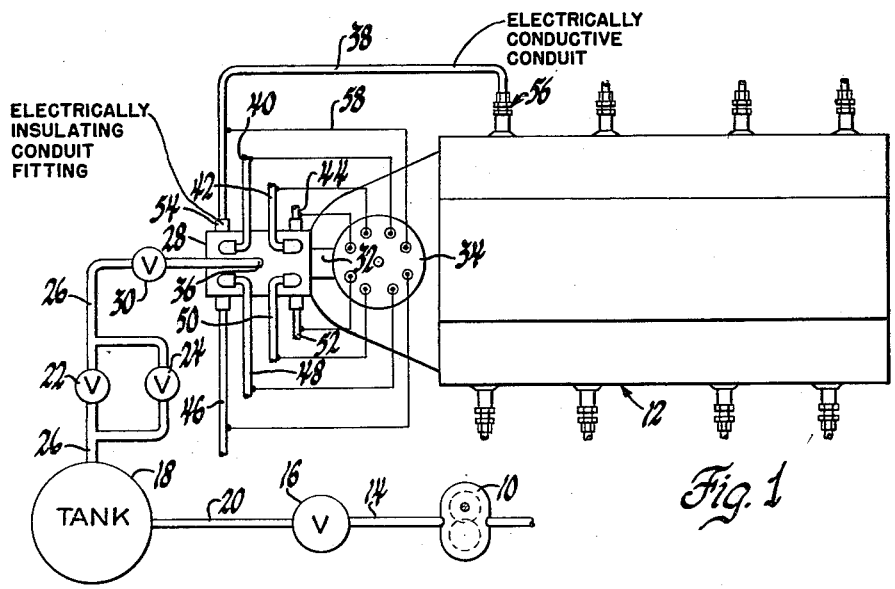
FIGURE 1 is a schematic view of the system as installed on a V–8 type internal combustion engine.

My co-pending application referred to above discusses in detail the advantages and operation of a system for injecting air into the engine combustion chamber at properly timed intervals and in the proper quantities in order to obtain various advantageous results. These results include a decrease in the amount of carbon monoxide and hexane as well as other unburned hydrocarbons in the exhaust system, an increase in engine power, and better detonation characteristics.

The pump 10 may be a suitable source of compressed air which is driven by the engine 12. The pump 10 should have sufficient capacity to provide the required amount and pressure of compressed air during engine idle operation for the system to work satisfactorily. The air discharged from the pump may pass through conduit 14 to a suitable control valve 16, and then to a reservoir 18 through conduit 20. Suitable control valves 22 and 24 may be provided in reservoir discharge conduit 26, which leads to the air timing and distribution valve 28. A final control valve 30 may be provided in conduit 26 adjacent the air timing and distribution valve 28, if desired.

Valve 28 may be constructed in a manner similar to the air timing and distribution valve disclosed and claimed in my application referred to above. The valve is driven in timed relation to the crankshaft of the engine 12 in a suitable manner such as connecting it with the distributor drive portion of the engine. This connection is illustrated schematically at 32. The engine distributor 34 forming a portion of the engine electrical system is commonly driven through a gear and shaft linkage from the engine camshaft which is in turn driven by the engine crankshaft.

Air from conduit 26 enters valve 28 at inlet 36 and leaves the valve in timed relation to the engine crankshaft through conduits 38, 40, 42, 44, 46, 48, 50 and 52. Each of these conduits leads to a spark plug which include structure for introducing air to one of the combustion chambers of the engine 12. Since the engine 12 is illustrated as having eight cylinders, eight air supply conduits are provided. If engines having different numbers of cylinders are to be used it is obvious that a different number of air conduits would be provided.

Since the system is similar for each of the cylinder connections only details of conduit 38 and its connections will be described. The adapter 54 which connects the housing of valve 28 and the conduit 38 is provided with an electrically insulated section so that conduit 38 may be used as the spark plug terminal lead for the spark plug assembly 56. Conduit 38 is positioned sufficiently far from the housing portion of valve 28 to eliminate the possibility of an electrical spark from firing at this point instead of at the spark plug electrodes. Conduit 38 may be made of copper tubing or any other suitable conduit material having electrical conduction properties of the nature required of spark plug terminal leads. The conduit 38 is illustrated as being formed of a metal tube such as copper tubing. An insulation sheath may also be provided if desired.

The spark plug terminal leads normally connecting the distributor 34 with the engine spark plugs are instead connected to the conduits such as conduit 38 at a point which may be adjacent valve 28. For example, lead 58 connects distributor 34 to conduit 38 so that the electrical connection is made from the distributor to the spark plug assembly 56.

Figure 2:
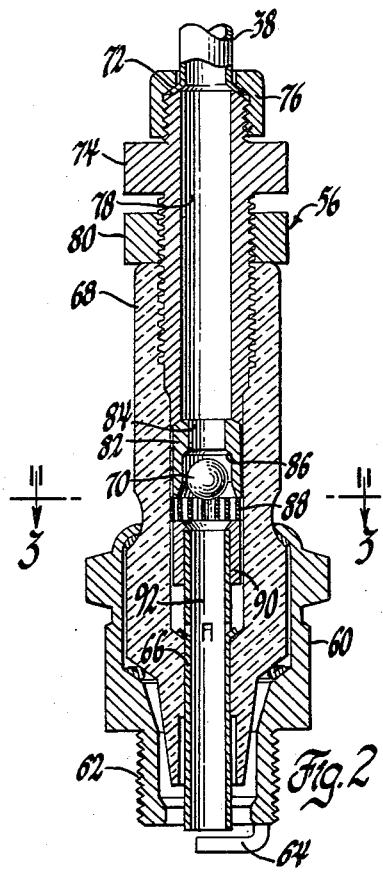
FIGURE 2 is a cross section view of the spark plug structure through which the compressed air is introduced into the combustion chamber of the engine.
Figure 3:
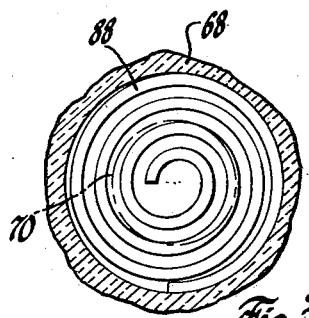
FIGURE 3 is a section view taken in the direction of arrows 3—3 of FIGURE 2.

Spark plug assembly 56 is illustrated in detail in FIGURE 2. It includes the metallic shell 60 of which is of conventional construction and provided with a threaded end 62 which is threaded into the spark plug opening leading to one of the combustion chambers of engine 12. An outer electrode 64 is secured to threaded end 62 and is positioned adjacent the spark plug inner electrode 66 so that a spark plug gap is established between these two electrodes. An insulation shell 68 is sealed within metallic shell 60 and secured within that shell in accordance with the usual practice of manufacturing spark plugs. Shell 60 provides a mount for the inner electrode 66 and also includes a chamber in which a check valve 70 may be retained. Check valve 70 operates to admit air from conduit 38 through the spark plug assembly and into the engine combustion chamber when air from conduit 38 has a pressure in excess of the combustion chamber pressure. Conduit 38 may be flared at 72 and secured to terminal adapter 74 by the conduit retaining nut 76.

Adapter 74 has a passage 78 formed therethrough which connects with the passage of conduit 38 and conduts compressed air into the spark plug assembly portion within the insulation shell 68. Adapter 74 may be provided with threads which secure the adapter into the upper end of the insulation shall 68. A lock nut 80 may be threaded on adapter 74 so as to lock the adapter into the insulation shell. The lower end of adapter 74 seats against the upper end of check valve seat member 82. Valve seat member 82 has a passage 84 extending therethrough and connecting with adapter passage 78. Valve seat 86 is formed on a shoulder within passage 84 and ball check valve 70 will seat against seat 86 when the pressure acting underneath the valve is greater than the pressure in the upper part of passage 84. A coil spring valve retainer 88 engages the lower end of valve seat member 82 and also retains valve 70 adjacent seat 86. The spring coils permit air to pass beyond the valve 70 since the coils are spaced radially apart. The outer coil of retainer 88 may be substantially circular so that it engages the major portion of the lower end of the member 82. The retainer also engages the upper end of the inner electrode retaining member 90 which is received within insulation shell 68.

Inner electrode 66 is formed from a tube so that its air passage 92 connects with passage 84 of seat member 82. When check valve 70 is opened, air may pass from conduit 38 to the engine combustion chamber through the inner electrode passage 92. The air discharged from the inner electrode 66 impinges upon the outer electrode 64 and tends to cool both electrodes and keep carbon deposits from accumulating. The air flow is also broken up by outer electrode 64 and spreads throughout the engine combustion chamber.

What is claimed is:

In an air injection system for an internal combustion engine having a source of compressed air, an air discharge and timing valve adapted to be driven in timed relation to the engine, conduit means connecting said air source and said valve, and air introducing means for introducing air into the engine combustion chamber; conduit means for conducting air from said air distribution and timing valve to said introducing means, said conduit including an electrically insulated section adjacent said air distribution and timing valve and an electrically conducting section connecting with said introducing means, and electrical lead means for connecting the engine electrical distributor to said electrical conducting section of said conduit means for conducting electricity to the engine spark plug from the engine distributor.

References Cited in the file of this patent

UNITED STATES PATENTS

| | | |
|---|---|---|
| 1,310,970 | Stroud | July 22, 1919 |
| 1,799,761 | Pew | Apr. 7, 1931 |
| 1,970,046 | Letterman | Aug. 14, 1934 |
| 2,011,986 | Schwarz | Aug. 20, 1935 |
| 2,403,440 | Jansson | July 9, 1946 |
| 2,441,277 | Lamphere | May 11, 1948 |